US009203311B2

(12) United States Patent
Penzo et al.

(10) Patent No.: US 9,203,311 B2
(45) Date of Patent: Dec. 1, 2015

(54) BUCK-BOOST CONVERTER WITH ACTIVE OUTPUT VOLTAGE DISCHARGE

(71) Applicant: Infineon Technologies AG, Neubiberg (DE)

(72) Inventors: Roberto Penzo, Chioggia (IT); Maurizio Galvano, Padua (IT); Paolo Milanesi, Padua (IT); Giovanni Capodivacca, Padua (IT)

(73) Assignee: Infineon Technologies AG, Neubiberg (DE)

( * ) Notice: Subject to any disclaimer, the term of this patent is extended or adjusted under 35 U.S.C. 154(b) by 84 days.

(21) Appl. No.: 14/199,633

(22) Filed: Mar. 6, 2014

(65) Prior Publication Data

US 2015/0256071 A1  Sep. 10, 2015

(51) Int. Cl.
*H05B 37/02* (2006.01)
*H02M 3/158* (2006.01)
*H05B 33/08* (2006.01)

(52) U.S. Cl.
CPC .......... *H02M 3/158* (2013.01); *H05B 33/0815* (2013.01)

(58) Field of Classification Search
USPC ............ 315/209 R, 224, 225, 291, 297, 307; 363/16, 17, 40, 98, 132; 323/224, 282, 323/283, 284, 285
See application file for complete search history.

(56) References Cited

U.S. PATENT DOCUMENTS

| 6,370,051 | B1* | 4/2002 | Patel | 363/132 |
| 7,911,193 | B2* | 3/2011 | Galvano et al. | 323/284 |
| 2009/0218960 | A1* | 9/2009 | Lyons et al. | 315/297 |
| 2010/0026203 | A1* | 2/2010 | Zhao et al. | 315/291 |

* cited by examiner

*Primary Examiner* — Tung X Le
(74) *Attorney, Agent, or Firm* — Shumaker & Sieffert, P.A.

(57) ABSTRACT

Methods, devices, and integrated circuits are disclosed for applying an active output voltage discharge for a buck-boost converter. One example is directed to a method of operating a buck-boost converter that comprises an inductor, an output capacitor, and an output. The method includes receiving an indication of an altered output voltage requirement in the buck-boost converter. The method further includes deactivating a control loop in the buck-boost converter. The method further includes applying an active discharge of voltage from the output capacitor through the inductor to ground, thereby altering the voltage at the output of the buck-boost converter from a first output voltage to a second output voltage that corresponds to the altered output voltage requirement. The method further includes reactivating the control loop.

20 Claims, 7 Drawing Sheets

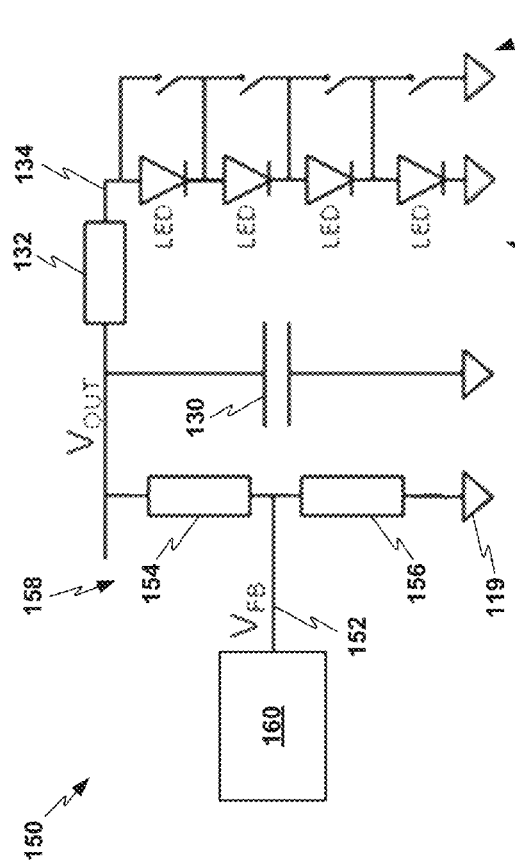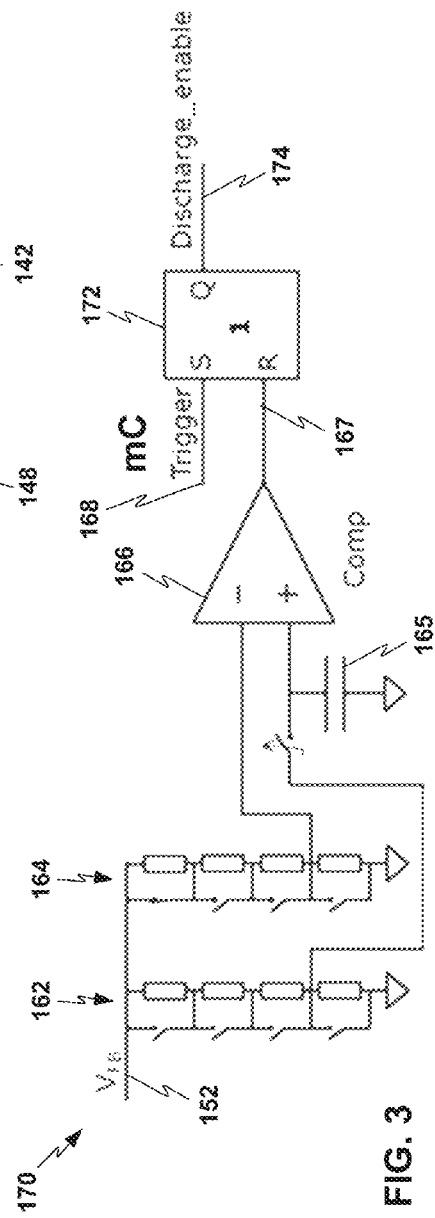
FIG. 2
FIG. 3

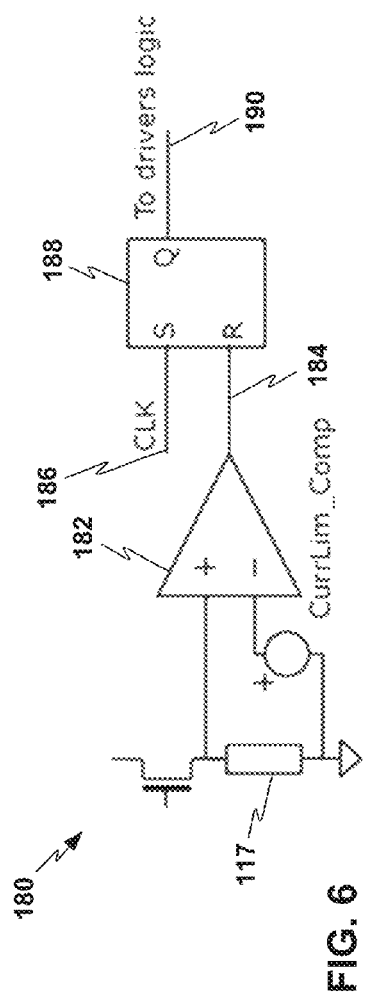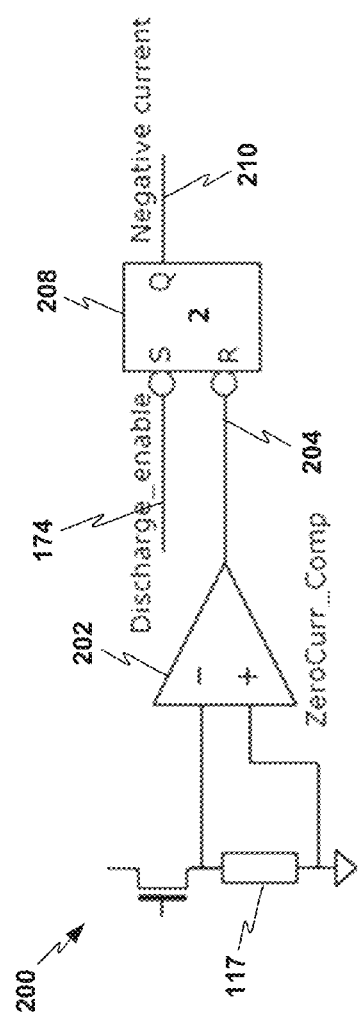

BUCK-BOOST CONVERTER WITH ACTIVE OUTPUT VOLTAGE DISCHARGE

TECHNICAL FIELD

The invention relates to electrical power converters, and in particular, to buck-boost converters.

BACKGROUND

DC/DC converters, including buck-boost converters, may be used as drivers for loads with specific current and/or voltage requirements, such as chains of light-emitting diodes (LEDs). The light intensity of an LED chain is controlled by the amount of current flowing through it. Generally, a closed loop current generator may be used to keep the current constant. For lighting with a high current load, switched-mode controllers may be used. In applications that demand high efficiency and high flexibility, such as in some automotive lighting applications, a synchronous buck-boost DC/DC converter topology may be used.

Some applications in automotive lighting or other applications involve a single LED chain made up of a number of LEDs. The number may vary depending on the specific application. One or more of the LEDs can be bypassed at times, temporarily reducing the length of the LED chain. A DC/DC converter may control the current flowing through the LED chain as different numbers of the LEDs in the chain are used, while the output voltage is set by the number and the forward voltage of the LEDs that compose the chain.

SUMMARY

In general, various examples of this disclosure are directed to current mode controlled synchronous buck-boost DC/DC converters with active output voltage discharge. Various examples of this disclosure may actively discharge output voltage and speed up a voltage step at the output, thereby making the voltage step at the output relatively independent from the load. Various examples of this disclosure may also enhance the capability of reaching the desired voltage value, thereby reducing or virtually eliminating the risk of current overshoot, among other advantages.

One example is directed to a method of operating a buck-boost converter that comprises an inductor, an output capacitor, and an output. The method includes receiving an indication of an altered output voltage requirement in the buck-boost converter. The method further includes deactivating a control loop in the buck-boost converter. The method further includes applying an active discharge of voltage from the output capacitor through the inductor to ground, thereby altering the voltage at the output of the buck-boost converter from a first output voltage to a second output voltage that corresponds to the altered output voltage requirement. The method further includes reactivating the control loop.

Another example is directed to a buck-boost converter comprising an inductor, an output capacitor, an output, and a controller. The controller is configured to receive an indication of an altered output voltage requirement in the buck-boost converter. The controller is further configured to deactivate a control loop in the buck-boost converter. The controller is further configured to apply an active discharge of voltage from the output capacitor through the inductor to ground, thereby altering the voltage at the output of the buck-boost converter from a first output voltage to a second output voltage that corresponds to the altered output voltage requirement. The controller is further configured to reactivate the control loop.

Another example is directed to an integrated circuit configured to control a buck-boost converter, the buck-boost converter comprising an inductor, an output capacitor, and an output. The integrated circuit is configured to receive an indication of an altered output voltage requirement in the buck-boost converter. The integrated circuit is further configured to deactivate a control loop in the buck-boost converter. The integrated circuit is further configured to apply an active discharge of voltage from the output capacitor through the inductor to ground, thereby altering the voltage at the output of the buck-boost converter from a first output voltage to a second output voltage that corresponds to the altered output voltage requirement. The integrated circuit is further configured to reactivate the control loop.

The details of one or more examples of the invention are set forth in the accompanying drawings and the description below. Other features, objects, and advantages of the invention will be apparent from the description and drawings, and from the claims.

BRIEF DESCRIPTION OF DRAWINGS

FIG. 2 is a block diagram illustrating an output section of a buck-boost converter and LED chain, in accordance with an example of this disclosure.

FIG. 3 is a block diagram illustrating an output voltage comparator section of a buck-boost converter with active output voltage discharge, in accordance with an example of this disclosure.

FIG. 6 is a block diagram illustrating an active discharge monitoring circuit for a buck-boost converter with active output voltage discharge, in accordance with an example of this disclosure.

FIG. 7 is a block diagram illustrating a current recovery monitoring circuit for a buck-boost converter with active output voltage discharge, in accordance with an example of this disclosure.

DETAILED DESCRIPTION

Figure 1:
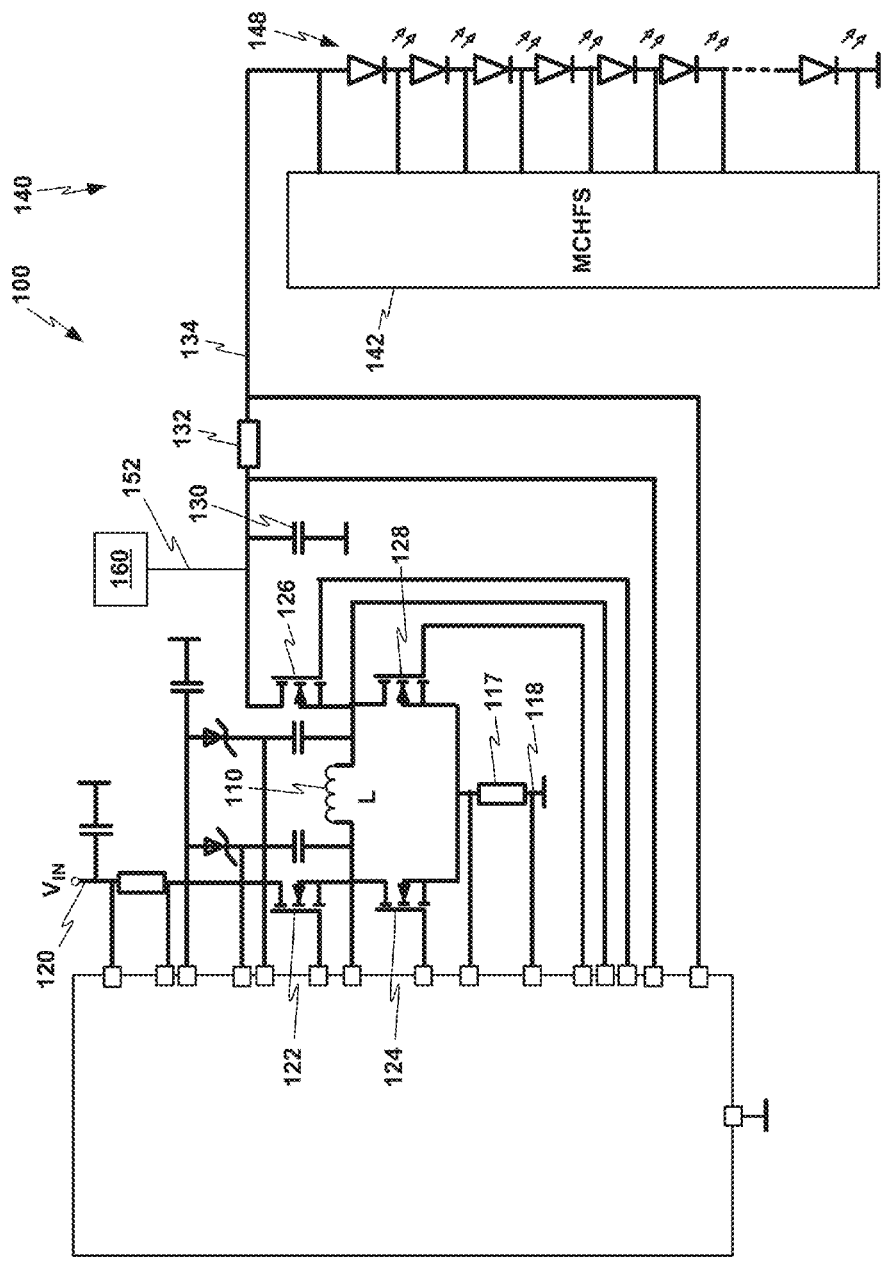
FIG. 1 is a block diagram illustrating a buck-boost converter and an LED chain assembly, in accordance with an example of this disclosure.

FIG. 1 is a block diagram illustrating a buck-boost converter 100 and LED chain assembly 140, in accordance with one example of this disclosure. LED chain assembly 140 includes LED chain 148 and multi-channel switch chain 142. Buck-boost converter 100 includes a voltage input 120, and a voltage output 134 coupled to the LED chain assembly 140. Buck-boost converter 100 also includes an inductor 110, and switches 122, 124, 126, and 128 coupled to inductor 110 in such a way as to apply different circuit connections across inductor 110. Buck-boost converter 100 further includes output capacitor 130 and output resistor 132 coupled to voltage output 134. Buck-boost converter 100 further includes active discharge control element 160, coupled to voltage output 134 via feedback voltage line 152, in this illustrative example. Active discharge control element 160 may enable applying an active discharge or a fast discharge to the voltage output 134, and is further described below, in accordance with various illustrative examples.

As noted above, some applications of buck-boost converters, such as in some automotive lighting applications or other applications, have an LED chain made up of a number of LEDs. The number of LEDs may vary depending on the specific application. One or more of the LEDs can be bypassed, shortening the LED chain and temporarily reducing the length of the LED chain. A DC/DC converter, such as a buck-boost converter, may control the current flowing through the LED chain, while the output voltage is set by the number and the forward voltage of the LEDs that compose the chain. When one or more of these LEDs are bypassed, and the chain length is thereby reduced, the output tank capacitor of the DC/DC converter may be discharged through the remaining LEDs. The current of this discharge is limited only by the series resistances of the LEDs themselves, so that when the output tank capacitor of the DC/DC converter is discharged through a reduced portion of the LEDs, the current may be higher, and may exceed the maximum current the LEDs are designed to withstand. The time needed by the controller to react to this current overshoot is limited by the closed loop bandwidth, such that the controller may not react quickly enough to prevent a current overshoot significant enough to damage or destroy the LEDs.

One solution to this current overshoot, with its potential to exceed the maximum current an LED can withstand, is to stop the energy transfer to the load, and let the LED chain current discharge the output capacitor to the final voltage value before bypassing one or more of the LEDs. However, the time taken by this discharging procedure to complete is typically not controlled, because it depends only on the capacitor value and the sum of the series resistances of the LED chain. Since the capacitance of the output capacitor in a buck-boost converter is generally relatively high, to guarantee a low output current ripple, the time taken by this discharging procedure can turn out to be long enough to cause a noticeable dimming of the lights of the LED chain during the discharge. Moreover, depending on the number of LEDs in the chain and the number of LEDs to be bypassed, a circuit may not be ensured of reaching the final target voltage, and thus may not eliminate a potentially destructive current overshoot once a portion of the LEDs are bypassed, that may damage or destroy the remaining LEDs in the shortened LED chain.

Various examples of this disclosure are directed to a current mode controlled synchronous buck-boost converter with fast, active output voltage discharge that may resolve the challenges discussed above. In various examples of this disclosure, such as in the example of FIG. 1, a synchronous buck-boost converter 100 may invert the direction of the current flowing through its inductor 110, such that current flows from its output capacitor 130 to ground 118 through inductor 110 and output resistor 117. By using an inverted current through inductor 110, buck-boost converter 100 actively discharges output capacitor 130 until a desired new value of voltage is reached at output 134, before bypassing one or more of the LEDs in LED chain 148. The desired new value of voltage, or second output voltage, reached at output 134 corresponds to the altered output voltage requirement of the shortened LED chain, with only a subset of the LEDs in LED chain 148. Thus, buck-boost converter 100 with active output voltage discharge may be contrasted with other types of circuits that merely allow the output voltage to discharge passively before bypassing a portion of the load.

A synchronous buck-boost converter of this disclosure may also implement a state machine that is able to perform a fast, active discharge of the output capacitor 130 triggered by a microcontroller. The microcontroller may control various switches to change the configuration of the buck-boost converter (as further described below) before switching the output to an altered load with altered output voltage requirement, such as by bypassing one or more of the LEDs in LED chain 140. An active discharge process of this disclosure may use features of a current mode controlled synchronous buck-boost converter in combination with monitoring the output voltage at output 134 to monitor when a voltage step is concluded from a first output voltage to a second output voltage that corresponds to the altered output voltage requirement of the altered load, such as a shortened LED chain. In some examples, a microcontroller may monitor the output voltage at output 134 that indicates when the voltage step is concluded through a resident analog-to-digital converter (ADC), thereby enhancing real-time communication. In some examples, a microcontroller may monitor the output voltage that indicates when the voltage step is concluded in a flexible way by including in a controller of buck-boost converter 100 a circuit with resistor dividers and a comparator, such as the example depicted in FIG. 3. Additional examples of circuits for monitoring and controlling the operations of buck-boost converter 100 are described further below with reference to FIGS. 6 and 7. Buck-boost converter 100 may include components such as a microcontroller, an analog-to-digital converter, a circuit with resistor dividers and a comparator, and/or other control components in active discharge control element 160 in the example depicted in FIG. 1.

A buck-boost converter 100 in accordance with this disclosure may resolve some or all of the shortcomings noted above, such as the potential for current overshoot, the potential to exceed the maximum current an LED can withstand, the potential for dimming of the LED chain, and the potential destruction of the LEDs, among other potential examples. For example, instead of discharging output capacitor voltage through either the complete LED chain or a reduced number of the LEDs in the LED chain, buck-boost converter 100 may instead apply an active discharge, or a fast discharge, of the output voltage from voltage output 134 through inductor 110 of buck-boost converter 100 to ground. This active discharge of voltage may be significantly faster than a passive discharge of voltage through either the complete or shortened LED chain. Buck-boost converter 100 may receive an indication of an altered output voltage requirement, such as for a reduced number of LEDs, and in response, deactivate a current control loop or voltage control loop, and apply the active discharge. Buck-boost converter 100 may control the flow of current through inductor 110 by opening and closing switches 122, 124, 126, and 128, as further described below with reference to FIGS. 4 and 5. Once the active discharge is completed, buck-boost converter 100 may resume a forward current through inductor 110 to output 134 while output capacitor 130 is at the second output voltage, and reactivate the current control loop or voltage control loop to apply the selected output current at the output 134 while the output capacitor 130 is at the second output voltage. Aspects of these functions of buck-boost converter 100 are further described below.

The example of an LED chain as the applicable load is presented in detail as an illustrative example of an application of a load with variable voltage requirements that may be strongly affected by varying currents. A buck-boost converter 100 in accordance with this disclosure may also be used in any other application involving supplying voltage to a load with variable voltage requirements. In these examples, instead of discharging output capacitor voltage through either a load at a higher required voltage or through the load at a lower required voltage, buck-boost converter 100 may instead apply a fast, active discharge through inductor 110 to ground, and then apply and maintain a selected output current at output 134 while output capacitor 130 is at the second output voltage.

FIG. 2 is a block diagram illustrating an output section 150 of a buck-boost converter and an LED chain 148, in accordance with an example of this disclosure. Buck-boost converter output section 150 includes resistors 154 and 156 between output capacitor 130 and ground 119. Resistors 154 and 156 are positioned on either side of feedback voltage line 152, which is coupled to active discharge control element 160. Output capacitor 130 is coupled to output 134 through output resistor 132. Output 134 is coupled to LED chain 148 and multi-channel switch chain 142, which includes a corresponding switch for each LED in LED chain 148. Multi-channel switch chain 142 thereby controls which of the LEDs in LED chain 148 are activated at a given time.

FIG. 3 is a block diagram illustrating an output voltage comparator section 170 of a buck-boost converter with active output voltage discharge, in accordance with an example of this disclosure. Output voltage comparator section 170 in the example of FIG. 3 may be included in an implementation of active discharge control element 160 as shown in FIGS. 1 and 2, in some examples. Output voltage comparator section 170 may therefore be coupled to output 134 of buck-boost converter 100 via feedback voltage line 152. Output voltage comparator section 170 includes two mode switch chains 162, 164, coupled to the inputs of a comparator 166. Mode switch chains 162, 164 are further described below.

Output voltage comparator section 170 also includes mode switch capacitor 165 coupled to the output of mode switch chain 162 and the corresponding input of comparator 166. The output 167 of the comparator 166 is coupled to the reset input of a latch 172, while a microcontroller trigger 168 is coupled to the set input of latch 172. The output 174 of latch 172 is a discharge enable signal line, that controls buck-boost converter 100 to apply an active discharge of an output voltage via an inverted current through an inductor to ground. Output voltage comparator section 170 may thereby control when a buck-boost converter 100 begins and finishes a fast, active discharge of an output voltage, in one example, as further described below.

Mode switch chains 162, 164 may include resistor dividers and each include a chain of resistors with a corresponding chain of switches, enabling each resistor in each chain to be independently included or bypassed in its current path. Mode switch chains 162, 164 may also be referred to as resistor divider chains. Each resistor may define a voltage drop that represents (in a version scaled by resistor divider 154-156) the forward voltage of one of the LEDs in LED chain 148. One of mode switch chains 162, 164, e.g., mode switch chain 162, may be set to a current number of LEDs included in LED chain 148, as in FIGS. 1 and 2, prior to a voltage step. That is, mode switch chain 162 may include a number of resistors equal to the number of LEDs in LED chain 148, and the switches of mode switch chain 162 may all be set to off, so that mode switch chain 162 is set to include all of its resistors in its current path.

The current number of LEDs may be all of the LEDs in LED chain 148, as in the example discussed above. Mode switch chain 164 may be set to include a subset of its resistors in its current path, where the subset of included resistors is equal to the number of LEDs of LED chain 148 to be included in the new, shortened LED chain with a reduced output voltage requirement. Mode switch chain 162 may thereby be set to have a voltage drop proportional to the voltage drop of LED chain 148 in its initial load configuration, while mode switch chain 164 is thereby set to have a voltage drop proportional to the voltage drop of LED chain 148 in its desired final configuration or other altered load configuration after applying the voltage step, with its new, altered output voltage requirement. In other examples, the altered load configuration may be any load configuration with a voltage requirement that is lower than the voltage requirement with the initial load configuration.

Mode switch capacitor 165 may sample and hold the voltage of the output of mode switch chain 162. Mode switch chains 162, 164 may each be reset or reprogrammed to correspond to any current and new numbers of LEDs in LED chain 148, or to current and new elements in any other type of load with altered voltage requirements in other examples.

When latch 172 applies the discharge enable signal from its output (e.g., the output of latch 172 goes high), it controls buck-boost converter 100 to open a current path from output capacitor 130 (referring to the examples of FIGS. 1 and 2) in an inverted path through inductor 110 to ground, thereby inverting the current through inductor 110 and applying an active discharge of the output voltage from output 134. The active discharge of the output voltage is further described below with reference to FIG. 4. A subsequent current recovery step that may be used in some examples is described below with reference to FIG. 5.

Therefore, the two mode switch chains 162, 164 each have a number of resistors equal to the maximum number of LEDs in LED chain 148, such as in the example depicted in FIG. 2. In this example, the two mode switch chains 162, 164 represent, through the sets of configurable switches in parallel, the initial and final numbers of LEDs in the LED chain, respectively, before and after a selected portion of the LEDs in the chain are bypassed, thereby altering the output voltage requirement. The voltage at the first mode switch chain 162 prior to the voltage reduction may be sampled with mode switch capacitor 165 and used as a reference for the second mode switch chain 164, programmed with the new LED number of the shortened LED chain and the corresponding altered output voltage requirement. In other examples, buck-boost converter 100 may employ only a single mode switch chain (or resistor divider chain) with appropriate timings, such as by first sampling the voltage in a mode switch chain with the initial load configuration (e.g., the initial number of LEDs in the load), and then programming the mode switch chain with the altered load configuration (e.g., the new LED number in the load).

When one of the LEDs of the LED chain is going to be bypassed, a microcontroller of buck-boost converter 100 may send a trigger command to a DC/DC converter controller to enter a fast discharge (or active discharge) operation state. This fast discharge operation state may use the same configuration of switches as when buck-boost converter 100 is in a synchronous recirculation of the buck mode. The microcontroller may use this fast discharge operation state to apply a negative voltage drop across the inductor 110, in order to quickly reduce and invert the current supplied to the output 134, thereby rapidly discharging the output capacitor 130 without applying the voltage discharge through LED chain 148. An example of this fast discharge operation state is depicted in FIG. 4.

Figure 5:
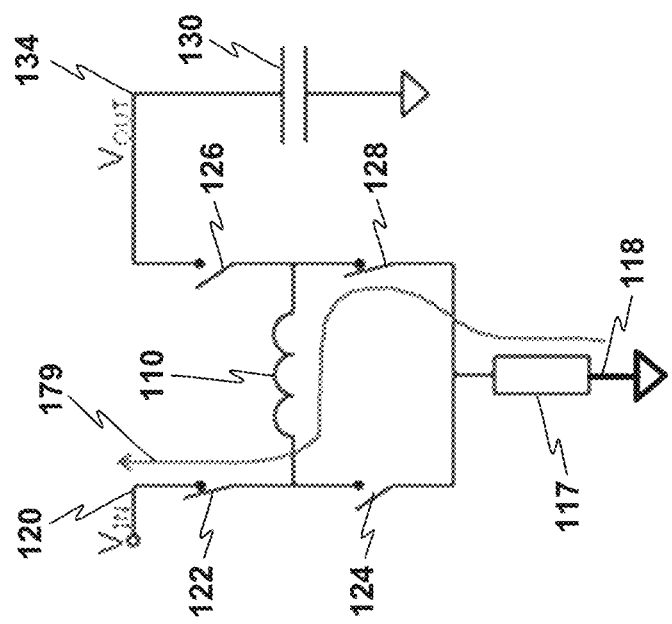
FIG. 5 is a block diagram illustrating a current recovery configuration of a buck-boost converter with active output voltage discharge, in accordance with an example of this disclosure.
Figure 4:
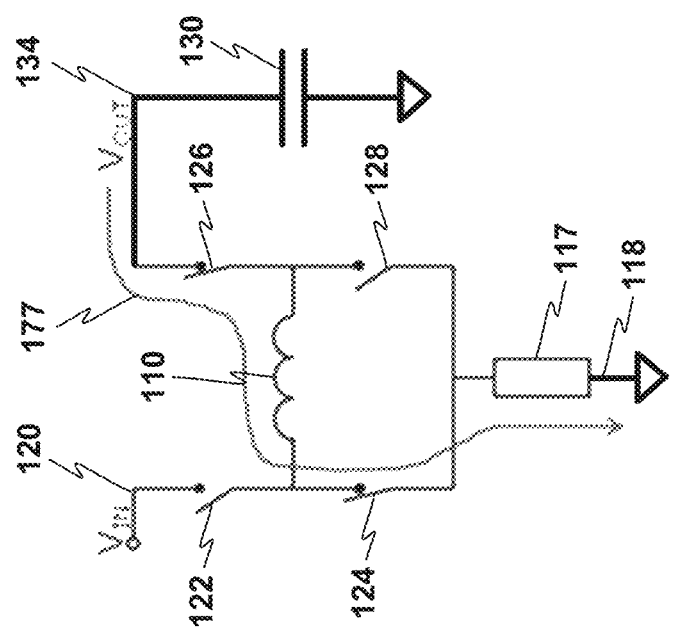
FIG. 4 is a block diagram illustrating an active discharge configuration of a buck-boost converter with active output voltage discharge, in accordance with an example of this disclosure.

FIG. 4 is a block diagram illustrating an active discharge configuration of a buck-boost converter with active output voltage discharge, in accordance with an example of this disclosure. FIG. 5 is a block diagram illustrating a current recovery configuration of a buck-boost converter with active output voltage discharge, in accordance with an example of this disclosure. FIGS. 4 and 5 both show a portion of buck-boost converter 100 including input 120, inductor 110, ground 118, output 134, output capacitor 130, and switches 122, 124, 126, and 128. In the active discharge configuration shown in FIG. 4, switches 124 and 126 are closed while switches 122 and 128 are open, thereby isolating inductor 110 from input 120 and creating a current path between output 134 and ground 118 running through inductor 110. Current flow path 177 is depicted as an abstract representation of an inverted current flow from output capacitor 130 through inductor 110 to ground 118.

In this example, once a current limit on inductor 110 is reached, as determined with an inductor current sensing resistor, for instance, a current limit comparator (or "CurrLim_Comp") may reset a latch that commands the drivers for buck-boost converter 100, and put the buck-boost converter 100 in a current recovery configuration, as further described below with reference to FIG. 6. In this current recovery configuration, switches 122, 124, 126, and 128 are all reversed from their states in the active discharge configuration shown in FIG. 5. Switches 122 and 128 are closed, and switches 124 and 126 are opened, thereby isolating inductor 110 from output 134, and establishing a current path from input 120 through inductor 110 to ground 118. FIG. 6 shows current flow path 179 as an abstract representation of a current flow through inductor 110 between input 120 and ground 118.

The current recovery configuration shown in FIG. 5 may be the same as a configuration used to energize the inductor 110 in boost mode. This current recovery configuration applies a positive voltage drop equal to the input voltage $V_{IN}$ at input 120 to inductor 110. In this way, inductor 110 may safely exit a current limit condition. Buck-boost converter 100 may continue switching between the two conditions of active discharge and current recovery as needed until the target voltage is reached at output 134, based on commands from the clock and current limit signals, such as in the example depicted in FIG. 6.

FIG. 6 is a block diagram illustrating an active discharge monitoring circuit 180 for a buck-boost converter with active output voltage discharge, in accordance with an example of this disclosure. Active discharge monitoring circuit 180 includes a current limit comparator 182, which may serve as the current limit comparator as discussed above with reference to FIGS. 4 and 5, and may compare the current through inductor 110 with reference to a current limit reference. Output 184 of current limit comparator 182 is coupled to the reset input of latch 188, which has its set input coupled to a clock signal line 186, and its output 190 coupled to the drivers logic for buck-boost converter 100. The drivers logic coupled to output 190 may control switches 122, 124, 126, and 128, such that active discharge monitoring circuit 180 is enabled to control the configuration of switches 122, 124, 126, and 128 between an active discharge configuration, a current recovery configuration, and a normal operation mode.

Active discharge monitoring circuit 180 may thereby control the operation of buck-boost converter 100 in conditions of active discharge and current recovery and/or normal operation configurations. Comparator 182 of FIG. 6 may thus apply an output signal at output 184 to reset latch 188 after latch 188 sets buck-boost converter 100 in the active discharge configuration, toggling buck-boost converter 100 between the configurations of switches and the current flow paths shown in FIGS. 4 and 5. In this example, a clock signal input 186 as in FIG. 6 may trigger the set input of latch 188 and apply the active discharge configuration shown in FIG. 4, and a high output from comparator 182 may trigger the reset input of latch 188 and apply the current recovery configuration shown in FIG. 5, or a normal operation configuration, in different examples. Current limit comparator 182 may have an overlapping function in limiting current for a boost function in a normal boost operation of buck-boost converter 100.

The buck-boost converter 100 may perform the same operation in the current recovery state as it does when acting as a boost converter with maximum duty cycle. The current recovery operation may reverse the inverted current flow through inductor 110 and recover from negative to positive current.

FIG. 7 is a block diagram illustrating a current recovery monitoring circuit 200 for a buck-boost converter with active output voltage discharge, in accordance with an example of this disclosure. Current recovery monitoring circuit 200 of FIG. 7 may monitor the current recovery in buck-boost converter 100 during the current recovery state, and cause buck-boost converter 100 to exit the current recovery state once the current has recovered positive on the inductor, and return to normal operation. Current recovery monitoring circuit 200 may also include a small offset in current to account for a delay between sensing a given current and causing a transition in the operation state in buck-boost converter 100.

Current recovery monitoring circuit 200 of FIG. 7 includes a zero-current comparator 202 (or "ZeroCurr_Comp"), which compare the current through inductor current sensing resistor 117, as a proxy for the current through inductor 110, in comparison with a zero current reference. Output 204 of zero-current comparator 202 is coupled to the reset input of a zero-current comparator latch 208, which has its set input coupled to the discharge enable signal line 174, as discussed above. The output 210 is coupled to a negative current control line for buck-boost converter 100. In this way, current recovery monitoring circuit 200 may return the buck-boost converter 100 to normal operation once inductor current has returned to positive.

Buck-boost converter 100 may therefore continue alternating between the active discharge and current recovery configurations, as controlled by the clock and current limit signal inputs to latch 188 in active discharge monitoring circuit 180 FIG. 6, until buck-boost converter 100 reaches the target voltage at output 134. In the active discharge state, once the current limit is reached, the buck-boost converter 100 alternates back and forth between the two configurations of switches 122-128 as shown in FIGS. 4 and 5, as controlled by active discharge monitoring circuit 180 of FIG. 6. The target voltage may comprise a second output voltage that corresponds to the altered output voltage requirement, e.g., the output voltage requirement indicated for the shortened LED chain with some of the LEDs bypassed, such that the output voltage is appropriate to drive the new, lesser number of LEDs. The time taken to complete this operation may be proportional to a limit current, $I_{LIM}$. The limit current $I_{LIM}$ may be much higher than the load current, making the discharge of the output capacitor relatively fast (e.g., faster than discharging through the load), and ensuring that the procedure completes, regardless of the voltage jump and the load, because the active discharge of the output capacitor uses a current that can be considered "constant" in its mean value, as further described below with reference to FIG. 10. After the output reaches the target voltage, latch 188 may enter a current recovery state, and current recovery monitoring circuit 200 may also communicate to the microcontroller to cause the microcontroller to turn on a transistor that switches the load to a new load with an altered voltage requirement, such as by bypassing one or more LEDs in the LED chain to alter the load to a shortened LED chain.

Figure 8:
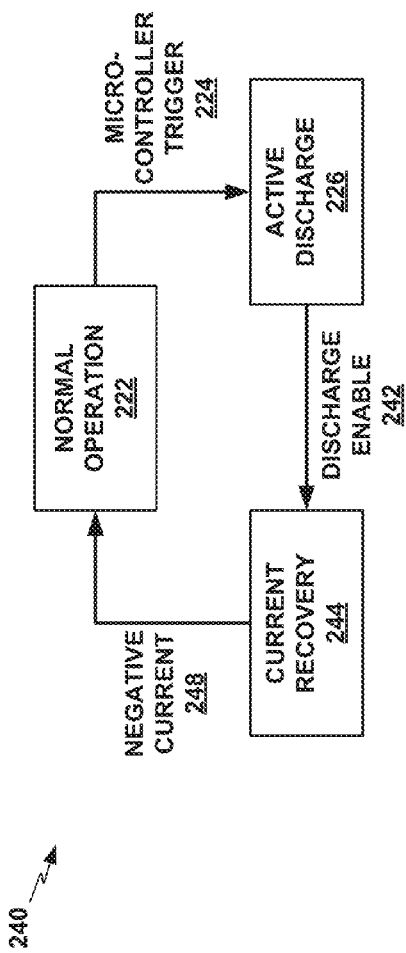
FIG. 8 is a flowchart illustrating a method of active output voltage discharge with a current recovery mode, in accordance with an example of this disclosure.

FIG. 8 is a flowchart illustrating a method 240 of active output voltage discharge with a current recovery mode, in accordance with an example of this disclosure that illustrates a process of active discharge with a current recovery stage as described above. FIG. 8 shows various states of a state machine, including a normal operation mode 222, an active discharge mode 226, and a current recovery mode 244. The active discharge mode 226 alters the voltage at the output of the buck-boost converter from a first output voltage to a second output voltage that corresponds to the altered output voltage requirement. Active discharge mode 226 corresponds to buck-boost converter 100 alternating back and forth between the two configurations of switches 122-128 as shown in FIGS. 4 and 5, as controlled by active discharge monitoring circuit 180 of FIG. 6. The buck-boost converter may enter current recovery mode 244 after active discharge mode 226.

The buck-boost converter may progress from active discharge mode 226 to current recovery mode 244 by triggering the discharge enable signal 242. Discharge enable signal 242 may also correspond to the discharge enable signal output line 174 of latch 172, that controls buck-boost converter 100 to apply an active discharge of an output voltage, as discussed above in the example of FIG. 3. From the current recovery mode 244, buck-boost converter 100 may trigger a negative current signal 248 to resume a forward current through the inductor to the output, which may correspond to a signal transitioning from high to low from zero current comparator 202 in the example of FIG. 7. Once the current has fully recovered after the process of the active discharge mode 226 and current recovery mode 244, buck-boost converter 100 may reactive a current control loop or voltage control loop to apply a selected output current at the output and the output capacitor of the buck-boost converter is at the second output voltage, or the target voltage at the output with the new load. Buck-boost converter 100 may thereby maintain the selected output current at the output at the second output voltage, in this example.

Figure 9:
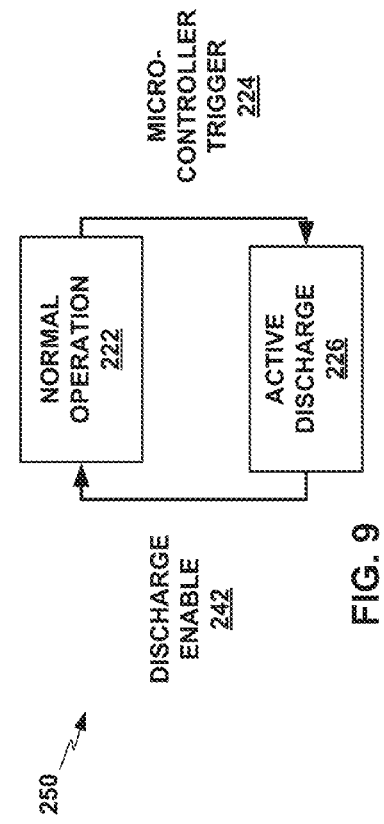
FIG. 9 is a flowchart illustrating a method of active output voltage discharge without a current recovery mode, in accordance with another example of this disclosure.

FIG. 9 is a flowchart illustrating a method 250 of active output voltage discharge in an example with a continuous conduction mode, as described above. Method 250 is a subset of method 240 as described above with reference to FIG. 8, which may be used in an example that does not use a zero current comparator 202 as in the example of FIG. 7, or that does not use a current recovery state 244. In method 250, a buck-boost converter may go from a normal operation state 222 to an active discharge state 226 in response to a microcontroller trigger 224 that serves as an indication of an altered output voltage requirement in the buck-boost converter. In this example, output capacitor 130 may continue to be discharged until the current in inductor 110 recovers the correct value and the buck-boost converter returns to normal operation state 222, without using a separate current recovery state 244 as in method 240 of the example of FIG. 8.

In examples in which a buck-boost converter has minimum/maximum duty-cycle operation protections, these too can be used both in Fast Discharge and Current Recovery operation states, ensuring a proper refreshing time for the top gate drivers' bootstrap capacitors. These are illustrated in the example simulation depicted in FIG. 10.

Figure 10:
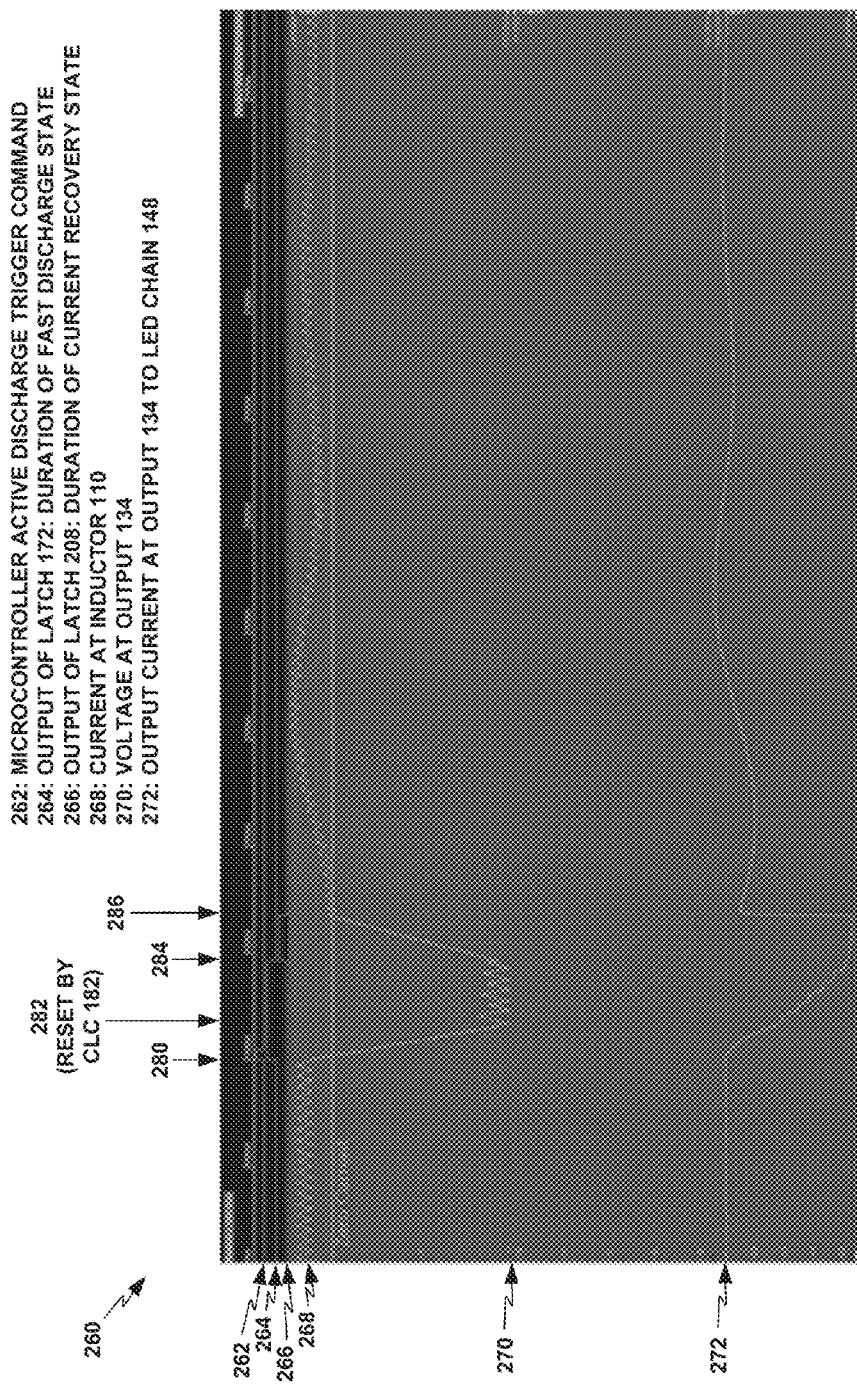
FIG. 10 is a signal graph illustrating a method of active output voltage discharge, in accordance with an example of this disclosure.

FIG. 10 is a signal graph 260 illustrating a method of active output voltage discharge, in accordance with an example of this disclosure. Signal graph 260 shows the output 262 of the trigger command from a buck-boost converter's microcontroller (as in microcontroller trigger 168 in FIG. 3); the output 264 of output voltage monitor comparator latch 172 (as in FIG. 3) determining the duration of the active discharge state; and the output 266 of zero-current comparator latch 208 (as in FIG. 7) that determines the duration of the current recovery state, in various examples. Signal graph 260 also shows the inductor current 268 through the inductor of the buck-boost converter (such as inductor 110 of buck-boost converter 100 in FIG. 1), the output voltage 270 of the buck-boost converter (such as at output 134 in the examples of FIGS. 1, 2, 4, and 5), and the current 272 through an LED chain driven by the buck-boost converter (such as LED chain 148 in the examples of FIGS. 1 and 2). Output voltage 270 is steady at an initial voltage before the initiation (shown at first time instance 280) of the active discharge process.

As shown by signal graph 260, trigger command output 262 goes high at first time instance 280, prompting output voltage monitor comparator latch output 264 to go high. This drives a steady inversion of inductor current 268, and steady declines in output voltage 270 and LED chain current 272. The inductor current 268 stops declining, shown at second time instance 282 once it reaches a certain maximum (negative) value at a current limit, under the control of a current limit comparator 182 of an active discharge monitoring circuit 180, as in FIG. 6. Inductor current 268 then oscillates near its maximum negative value, shown between second time instance 282 and third time instance 284 in graph 260, under the alternating control of a current recovery configuration and an active discharge configuration, to continue driving output voltage 270 and LED chain current 272 lower without exceeding a current limit. As indicated above in reference to FIG. 6, the active discharge of the output capacitor uses a current that can be considered "constant" in its mean value between second time instance 282 and third time instance 284 as shown in graph 260, in that the current is maintained within a relatively narrow range, which may be near or at a current limit, in some examples.

At third time instance 284 as shown in graph 260, zero-current comparator latch output 266 goes high and output voltage monitor comparator latch output 264 goes low, prompting the buck-boost converter to enter current recovery mode persistently, shown as inductor current 268 rising, until it completely reverses the negative current. This also causes output voltage 270 and LED chain current 272 to begin decreasing at a much slower pace. Inductor current 268 may hit zero, shown at fourth time instance 286, which may be detected by zero-current comparator 202 of current recovery monitoring circuit 200 as shown in FIG. 7. This may correspond to output voltage 270 stabilizing at a new, lower output voltage that corresponds to the altered output voltage requirement of the shortened LED chain or other modified load of the buck-boost converter. Zero-current comparator latch output 266 may then go low, returning the buck-boost converter to a normal operation mode in which the current 268 stabilizes in a positive current again (shown to the right of fourth time instance 286).

The buck-boost converter also triggers a switch to the new, modified load with the altered voltage requirement (e.g., the shortened LED chain), causing a step increase in the LED chain current 272 at fourth time instance 286, as the new, lower output voltage 270 is switched to a load with a lower total resistance. The new output voltage (output voltage 270 from fourth time instance 286 onward in graph 260) corresponds to the altered output voltage requirement, such that the LED chain current 272 returns (from fourth time instance 286 onward in graph 260) to approximately the same current as it was under its initial output voltage and load (to the left of first time instance 280 in graph 260). The final LED chain current (272 at the fourth time instance 286) may be approximately the same as the initial LED chain current 272 at the first time instance 280 in that it is within a nominal or acceptable range of a target voltage or normal operating voltage for the load (e.g., for the LEDs in the LED chain, either in its complete or shortened form). After fourth time instance 286, the current control loop of the buck-boost converter maintains the output current at the selected current.

The new output voltage may be said to correspond to the altered output voltage requirement in any of a number of ways, such as in that the second output voltage is closer to a voltage of the altered output voltage requirement than to the first output voltage. In more particular examples, the second output voltage may correspond to the altered output voltage requirement in that the second output voltage is within a nominal range of the altered output voltage requirement for the parameters of a particular circuit implementation. For example, the second output voltage may corresponds to the altered output voltage requirement in that the second output voltage may be within plus or minus one volt of a voltage of the altered output voltage requirement. In another example, the second output voltage may correspond to the altered output voltage requirement in that the second output voltage is within a range of plus or minus 0.3 volt of a voltage of the altered output voltage requirement. In another example, the difference between the first output voltage and a voltage of the altered output voltage requirement may be referred to as a voltage delta, and the second output voltage may correspond to the altered output voltage requirement in that the second output voltage is within a range of plus or minus one-third of the voltage delta of the voltage of the altered output voltage requirement.

Figure 11:
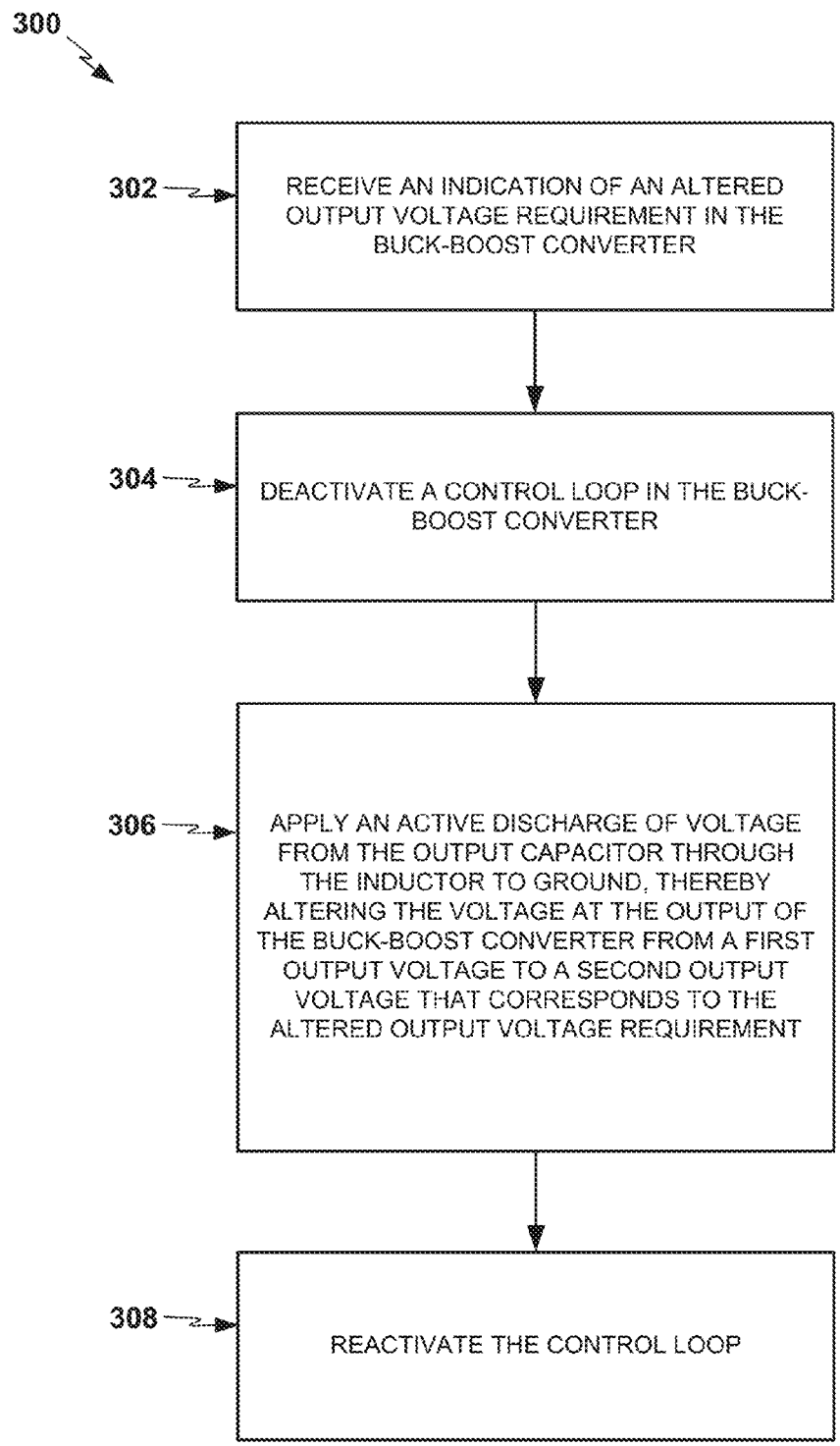
FIG. 11 is a flowchart illustrating a method of active output voltage discharge, in accordance with an example of this disclosure.

FIG. 11 is a flowchart illustrating a method 300 of active operating a buck-boost converter with output voltage discharge, where the buck-boost converter includes an inductor, an output capacitor, and an output, in accordance with an example of this disclosure. Method 300 includes receiving an indication of an altered output voltage requirement in the buck-boost converter (302). Method 300 further includes deactivating a control loop in the buck-boost converter (304). Method 300 further includes applying an active discharge of voltage from the output capacitor through the inductor to ground, thereby altering the voltage at the output of the buck-boost converter from a first output voltage to a second output voltage that corresponds to the altered output voltage requirement (306). Method 300 further includes reactivating the control loop (308).

Any of the circuits, devices, and methods described above may be embodied in or performed in whole or in part by any of various types of integrated circuits, chip sets, and/or other devices, and/or as software executed by a computing device, for example. This may include processes performed by, executed by, or embodied in one or more microcontrollers, central processing units (CPUs), processing cores, field-programmable gate arrays (FPGAs), programmable logic devices (PLDs), virtual devices executed by one or more underlying computing devices, or any other configuration of hardware and/or software.

Various examples of the invention have been described. These and other examples are within the scope of the following claims.

What is claimed is:

1. A method of operating a buck-boost converter, the buck-boost converter comprising an inductor, an output capacitor, and an output, the method comprising:
   receiving an indication of an altered output voltage requirement in the buck-boost converter;
   deactivating a control loop in the buck-boost converter;
   applying an active discharge of voltage from the output capacitor through the inductor to ground, thereby altering the voltage at the output of the buck-boost converter from a first output voltage to a second output voltage that corresponds to the altered output voltage requirement; and
   reactivating the control loop.

2. The method of claim 1, further comprising:
   monitoring the voltage at the output with reference to the altered output voltage requirement, during the applying of the active discharge of voltage; and
   in response to the voltage at the output corresponding to the altered output voltage requirement, reversing a negative current in the inductor, prior to reactivating the control loop.

3. The method of claim 1, wherein the control loop is a current control loop.

4. The method of claim 1, wherein the control loop is a voltage control loop.

5. The method of claim 1, wherein the second output voltage corresponds to the altered output voltage requirement in that the second output voltage is closer to a voltage of the altered output voltage requirement than to the first output voltage.

6. The method of claim 1, wherein the second output voltage corresponds to the altered output voltage requirement in that the second output voltage is within a range of plus or minus one volt of a voltage of the altered output voltage requirement.

7. The method of claim 1, wherein the second output voltage corresponds to the altered output voltage requirement in that the second output voltage is within a range of plus or minus 0.3 volt of a voltage of the altered output voltage requirement.

8. The method of claim 1, wherein a difference between the first output voltage and a voltage of the altered output voltage requirement is a voltage delta, and wherein the second output voltage corresponds to the altered output voltage requirement in that the second output voltage is within a range of plus or minus one-third of the voltage delta of the voltage of the altered output voltage requirement.

9. The method of claim 1, further comprising preventing the current from exceeding a current limit during the active discharge.

10. The method of claim 1, further comprising switching from an initial load configuration to an altered load configuration in response to the output capacitor being at the second output voltage.

11. The method of claim 10, wherein the initial load configuration comprises a load with an initial number of light-emitting diodes (LEDs), and the altered load configuration comprises a load with an altered number of the LEDs.

12. The method of claim 11, further comprising:
    setting a first resistor divider chain to have a number of resistors equal to the initial number of LEDs in the initial load configuration;

setting a second resistor divider chain to have a number of resistors equal to the altered number of LEDs in the altered load configuration; and determining the altered output voltage requirement with reference to the voltage at the second resistor divider chain in comparison with the voltage sampled at the first resistor divider chain.

13. The method of claim 1, further comprising switching from an initial load configuration to an altered load configuration in response to an output from a zero-current comparator latch.

14. A buck-boost converter comprising:
an inductor;
an output capacitor;
an output; and
a controller, wherein the controller is configured to:
  receive an indication of an altered output voltage requirement in the buck-boost converter;
  deactivate a control loop in the buck-boost converter;
  apply an active discharge of voltage from the output capacitor through the inductor to ground, thereby altering the voltage at the output of the buck-boost converter from a first output voltage to a second output voltage that corresponds to the altered output voltage requirement; and
  reactivate the control loop.

15. The buck-boost converter of claim 14, wherein the controller is further configured to:
  monitor the voltage at the output with reference to the altered output voltage requirement, during the applying of the active discharge of voltage; and
  in response to the voltage at the output corresponding to the altered output voltage requirement, reverse a negative current in the inductor, prior to reactivating the control loop.

16. The buck-boost converter of claim 14, wherein the second output voltage corresponds to the altered output voltage requirement in that the second output voltage is closer to a voltage of the altered output voltage requirement than to the first output voltage.

17. The buck-boost converter of claim 14, wherein the controller is further configured to switch from an initial load configuration to an altered load configuration in response to the output capacitor being at the second output voltage.

18. The buck-boost converter of claim 14, wherein the controller is further configured to:
  set a first resistor divider chain to have a number of resistors equal to the initial number of LEDs in the initial load configuration;
  set a second resistor divider chain to have a number of resistors equal to the altered number of LEDs in the altered load configuration; and
  determine the altered output voltage requirement with reference to the voltage at the second resistor divider chain in comparison with the voltage sampled at the first resistor divider chain.

19. An integrated circuit configured to control a buck-boost converter, the buck-boost converter comprising an inductor, an output capacitor, and an output, wherein the integrated circuit is configured to:
  receive an indication of an altered output voltage requirement in the buck-boost converter;
  deactivate a control loop in the buck-boost converter;
  apply an active discharge of voltage from the output capacitor through the inductor to ground, thereby altering the voltage at the output of the buck-boost converter from a first output voltage to a second output voltage that corresponds to the altered output voltage requirement; and
  reactivate the control loop.

20. The integrated circuit of claim 19, wherein the second output voltage corresponds to the altered output voltage requirement in that the second output voltage is closer to a voltage of the altered output voltage requirement than to the first output voltage.

* * * * *